United States Patent
Hofmann et al.

(10) Patent No.: US 8,342,607 B2
(45) Date of Patent: Jan. 1, 2013

(54) SEAT CUSHION WITH BUBBLE ELEMENTS

(75) Inventors: Manfred Hofmann, Hettstadt (DE); Günter Meckelmann, Kitzingen (DE)

(73) Assignee: F.S. Fehrer Automotive GmbH, Kitzingen (DE)

( * ) Notice: Subject to any disclaimer, the term of this patent is extended or adjusted under 35 U.S.C. 154(b) by 192 days.

(21) Appl. No.: 12/882,984

(22) Filed: Sep. 15, 2010

(65) Prior Publication Data
US 2011/0084539 A1      Apr. 14, 2011

(30) Foreign Application Priority Data
Oct. 8, 2009   (DE) .......................... 10 2009 048 734

(51) Int. Cl.
*A47C 7/34*   (2006.01)
(52) U.S. Cl. ................................ 297/452.41; 297/284.6
(58) Field of Classification Search ............. 297/452.41, 297/452.46, 284.6
See application file for complete search history.

(56) References Cited

U.S. PATENT DOCUMENTS

| | | | | | |
|---|---|---|---|---|---|
| 5,020,852 | A | * | 6/1991 | Marion | 297/452.41 X |
| 5,433,506 | A | * | 7/1995 | Jensen | 297/452.41 |
| 5,573,305 | A | * | 11/1996 | Storch | 297/452.41 X |
| 5,658,050 | A | * | 8/1997 | Lorbiecki | 297/452.41 X |

FOREIGN PATENT DOCUMENTS

DE   102007002002 A1   8/2007

* cited by examiner

*Primary Examiner* — Anthony D Barfield
(74) *Attorney, Agent, or Firm* — Quarles & Brady LLP

(57) ABSTRACT

A seat cushion for the production of a vehicle seat has a foam body and a carrier element. The carrier element is disposed on the back side of the foam body and provides mechanical support to the foam body on the back side thereof. At least one bubble element is disposed between the foam body and the carrier element and can be supplied with compressed air via an air inlet. The carrier element features an air-impermeable barrier layer on the side facing towards the foam body. The bubble element is composed of two bubble halves that are connected to one another by means of an airtight sealing joint, and wherein the bubble half facing away from the foam body is formed by a surface section of the barrier layer of the carrier element, and wherein the second bubble half facing towards the foam body is fastened at the assigned surface section of the barrier layer while forming the airtight sealing joint.

20 Claims, 2 Drawing Sheets

SEAT CUSHION WITH BUBBLE ELEMENTS

CROSS REFERENCE TO RELATED APPLICATION

This application claims priority to German Patent Application No. 10 2009 048 734.4, filed on Oct. 8, 2009, which is fully incorporated herein by reference.

STATEMENT REGARDING FEDERALLY SPONSORED RESEARCH OR DEVELOPMENT

Not applicable.

FIELD OF THE INVENTION

The present invention relates to a seat cushion having a foam body and a carrier element situated on the back side of the foam body, wherein a bubble element is disposed on the carrier element and is foamed into the foam body.

BACKGROUND OF THE INVENTION

To allow for enhanced seating comfort, in particular in vehicle seats the shape of the seat is varied by means of compressed-air-actuated bubble elements. Hence, individual adaptation of the seat contour to the respective person is rendered possible. Depending on the specific design, this function can additionally be used for massage purposes or for dynamical adaptation to driving situations.

For this purpose, several air bubbles are disposed on the back side of the cushion as a function of the desired level of comfort and embodiment. In general, the air bubbles are disposed at a carrier element which is mounted on a seat receptacle. The seat cushion is mounted on this carrier element having the air bubbles attached thereto. As a result of this type of design, the seat can be flexibly configured in terms of different air bubble variations. In this context, however, the complexity in terms of assembly is disadvantageous, since all individual air bubbles are separately mounted on one carrier and the seat cushion is subsequently disposed thereon. Moreover, the carrier fulfils the function of providing support to the air bubbles, such that in case of a non-planar seat receptacle, e.g. due to a wire spring system, any significant warpage in the region between the supporting surfaces of the seat receptacle does not occur. It is advantageous in the selection of a separate carrier that the respective configuration of air bubbles and the air distribution system can be preassembled at the carrier.

The assembly process of the seat cushion, however, involves the high risk that individual air bubbles may be displaced or air supply may be disrupted. As a consequence, seat production is slowed down and in some instances requires disassembly for rectification of malpositions or damage to the air distribution system.

SUMMARY OF THE INVENTION

Thus, it is an object of the present invention to dispose the air bubbles at the seat in such a manner that simple and secure assembly can be realized and displacement of the air bubbles and damage to the air inlet can be precluded.

This object is attained in one embodiment of a seat cushion including a foam body having a back side. A carrier element is disposed on the back side of the foam body and provides mechanical support to the foam body on the back side thereof. The carrier element includes an air-impermeable barrier layer on a side of the carrier element facing towards the foam body. At least one bubble element is disposed between the foam body and the carrier element, wherein the bubble element is composed of two bubble halves that are connected to one another by means of an airtight sealing joint. The bubble half facing away from the foam body is formed by a surface section of the barrier layer of the carrier element, and the second bubble half facing towards the foam body is fastened at the surface section of the barrier layer while forming the airtight sealing joint. An air inlet is in fluid communication with the at least one bubble element for supplying compressed air to the at least one bubble element.

A seat cushion for the production of a vehicle seat firstly is composed of a foam body. As a general rule, in this regard the foam body is composed of polyurethane foam. To produce a stabilizing effect, a carrier element is disposed on the back side of the foam body. This carrier element provides mechanical support to the foam body. For creation of the comfort function so as to be able to vary the seat contour, one or several bubble element(s) are disposed between the foam body and the carrier element. Provision needs to be mandatorily made for an air inlet in order to be able to supply the bubble element with compressed air.

It is a special characteristic of the invention that the carrier element features an air-impermeable barrier layer on the side facing towards the foam body. The bubble element, due to the functionality thereof, is composed of two bubble halves. These bubble halves are connected to one another in an airtight manner by means of a sealing joint. In accordance with the inventive design, the bubble half facing away from the foam body is formed by a surface section of the barrier layer of the carrier element. The corresponding second bubble half facing towards the foam body is fastened at the assigned surface section of the barrier layer while forming the airtight sealing joint.

By means of the fixed arrangement of the bubble element and the carrier element at the foam body while forming the seat cushion, it has been rendered possible to fulfill the requirement to unrestrictedly ensure both simple assembly and secure positioning of the bubble elements. The back side of the seat cushion thus forms a planar carrier layer preferably without loosely mounted parts.

In addition, the entire structure of the unit is simplified to the extent that for the formation of the bubbles, only one bubble half is respectively separately necessary while the second bubble half is formed by the usually required and hence available carrier element.

The carrier element inter alia fulfills the function of transmitting force from the seat cushion, respectively the foam body and the bubble elements, to the support structure of the seat. For this purpose, a stiffened nonwoven material, in particular a nonwoven polyester fabric, may be advantageously utilized.

In a simple embodiment, it is possible to form the barrier layer by a plastic foil. For this purpose, PU foil or PVC foil is particularly suitable.

In case of advantageous selection of the barrier layer, e.g. the plastic foil, it is possible to form the carrier element already from this barrier layer and hence to dispense with an additional nonwoven material.

By the same token, the carrier element may include plastic foam. In this connection, for instance polyurethane foam can be selected, the film layer on the upper side thereof forming the barrier layer.

For forming the bubble element it is necessary to fasten the second bubble half in an airtight manner on the barrier layer. This can be realized with the aid of a welding or else adhesive bonding process.

In particular in a vehicle seat, as a rule, a plurality of bubble elements are disposed. This is performed by fastening several bubble halves at correspondingly different positions or surface sections of the barrier layer at the carrier element, thereby forming several bubble elements.

To realize the function of the bubble elements, it is necessary to provide the same with compressed air. In case a plurality of bubble elements are present, it is hence advantageous if provision is made for a central air inlet. Thus, several bubble elements can be jointly supplied with compressed air via a compressed air distribution system fastened at the carrier element and starting from the air inlet.

The compressed air distribution system includes at least one valve unit in case a plurality of bubble elements fulfilling different functions are present. Thus, by means of actuating the valve unit, the air supply to at least one bubble element can be manipulated. In another embodiment, the valve unit controls the air supply to all correspondingly assigned bubble elements. Moreover, in case of a for instance symmetrical design, the symmetrically opposed bubbles can be connected to one another via a corresponding air conduit.

In a special embodiment, it is possible to configure a bubble element in such a manner that air is allowed to escape therefrom into the foam body. In this case, this function of the bubble element is ensured by the aspect that a reduced amount of air is allowed to escape compared to the amount of air that can be subsequently supplied by the compressed air inlet. It is equally conceivable to form a bubble element in such a manner that it does not feature any significant shape changing characteristics, but rather is supposed to realize the air flow into the foam body.

As a result of taking an advantageous selection of the bubble elements and the geometry thereof, it is not necessary to employ an additional element. However, in case of a correspondingly unfavorable seat contour or shape of the seat cushion, it may be necessary to employ a partition element between the bubble element and the foam body. By utilizing a partition element, reduced material thickness of the foam body-sided bubble half is equally realizable. By means of the partition element, compressive stresses exerted by the bubble element on the foam body are evenly distributed.

As a rule, a seat constitutes a three-dimensional structure. In this connection, the back side of the seat equally features a three-dimensional contour. In order to obtain a crease-free back side and simultaneously ensure functionality of the bubble elements, it is advantageous if the carrier element is three-dimensionally preformed so as to correspond to the support structure in the seat.

On the outside of the bubble elements, an airtight barrier layer is not necessary. In this connection, it is possible to configure the carrier element on the outside of the bubble elements in such a manner that the barrier layer is formed there so as to be air-permeable. This can be performed with the aid of perforated sections or punched-out sections on the barrier layer.

Another field of application for the inventive solution can be seen in the design of seats in which the head rest is integrated into the actual seat and does not constitute a separately mounted component. Such seat designs are frequently employed in so-called sports seats, since in this case, firstly less construction space both in the seat depth and in the x-direction is required and secondly reduced weight can be obtained.

This results from the aspect that in this embodiment, the mechanics for the head rest fastening and adjustment can be dispensed with and the otherwise necessary components are consequently rendered superfluous.

As regards seating comfort, however, in particular for safety reasons in case of an accident, it is strongly recommended to enable the performance of adjustments of the head rest corresponding to the individual seating position. This, however, is not possible in conventional sports seats known from the state of the art due to the lack of adjustability thereof.

This problem is advantageously solved by the inventive solution. In this way, it is possible to realize a flatly configured and at the same time lightweight seat while still ensuring the required adaptation to the individual seating position in the head region. In this process, the cushion support structure can be rigidly configured starting from the back rest up to the head region, for instance in the form of a hard fiber shell.

Thus, in an advantageous embodiment, it is enabled to realize the functionality of the head rest by means of the seat cushion, wherein the adaptation of the head abutment against the head rest is facilitated by at least one bubble element.

In conformity with the conventional configuration of sports seats using hard shells as cushion support structures without any additional resilient support, as a result of the evenly distributed supporting effect, only low stability of the carrier element is thus necessary.

BRIEF DESCRIPTION OF THE DRAWINGS

Exemplary embodiments are outlined in the figures described in the following.

In the drawings.

DETAILED DESCRIPTION OF THE EXAMPLE EMBODIMENTS

Figure 1:
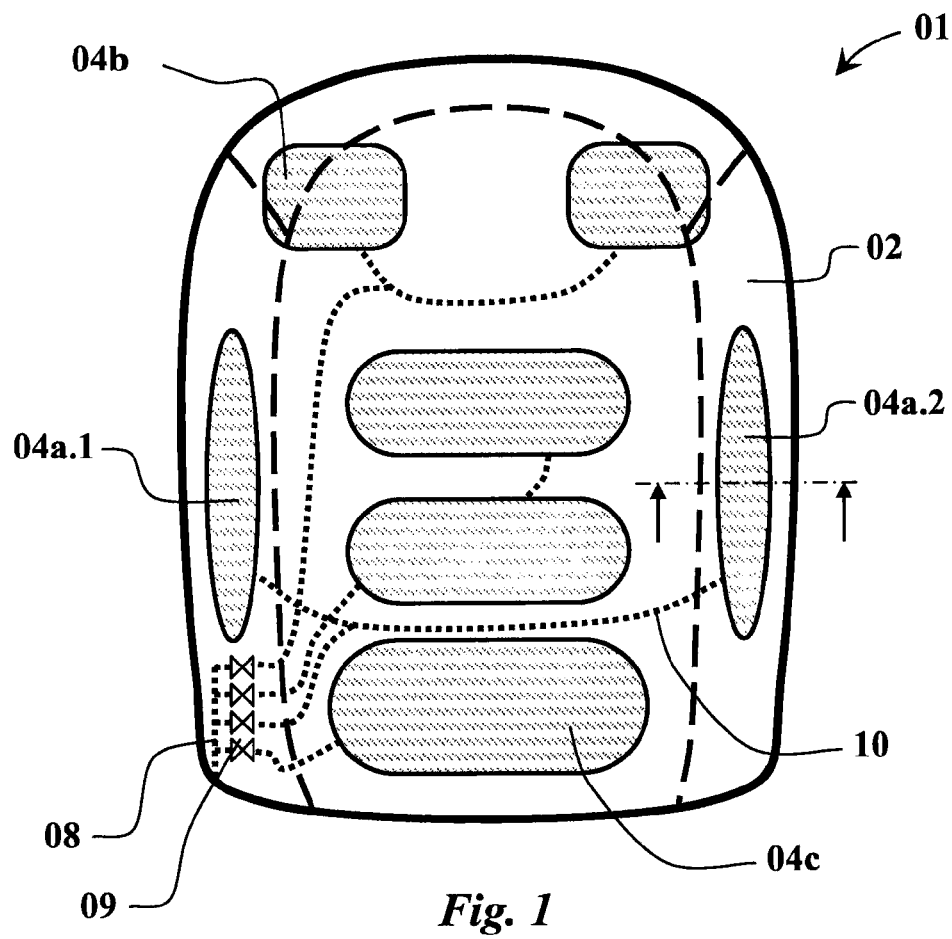
FIG. 1 shows an exemplary embodiment of a seat cushion having a plurality of bubble elements.

FIG. 1 shows an exemplary embodiment of a seat cushion 01 having a plurality of bubble elements 04. As is evident from this figure, first bubble elements 04a.1 and 04a.2 are disposed on both sides of the seat and are intended to provide the driver with improved lateral support. In the shoulder region, provision is further made for bubble elements 04b. Support in the region of the lumbar vertebrae is enabled with the aid of an additional bubble element 04c. By means of air conduits 10, bubble elements disposed in parallel are connected to one another. In this connection, these interconnected bubble elements are always simultaneously supplied with compressed air. The central air inlet 08 is laterally disposed on a lower side. This air inlet is guided towards a valve unit 09 from which the individual bubble elements can be supplied with compressed air.

The air inlet 08 having the valve unit 09 and the air conduits 10 forms the compressed air distribution system. This system is advantageously fixed at the carrier element on the side of the foam body and thus is foamed into the seat cushion. As a function of the space available both for cushioning and in the region of the support structure at the back of the cushion, it is equally possible to fix the compressed air distribution system to the back side of the carrier element. However, this aspect gives rise to increased complexity during seat assembly.

Figure 2:
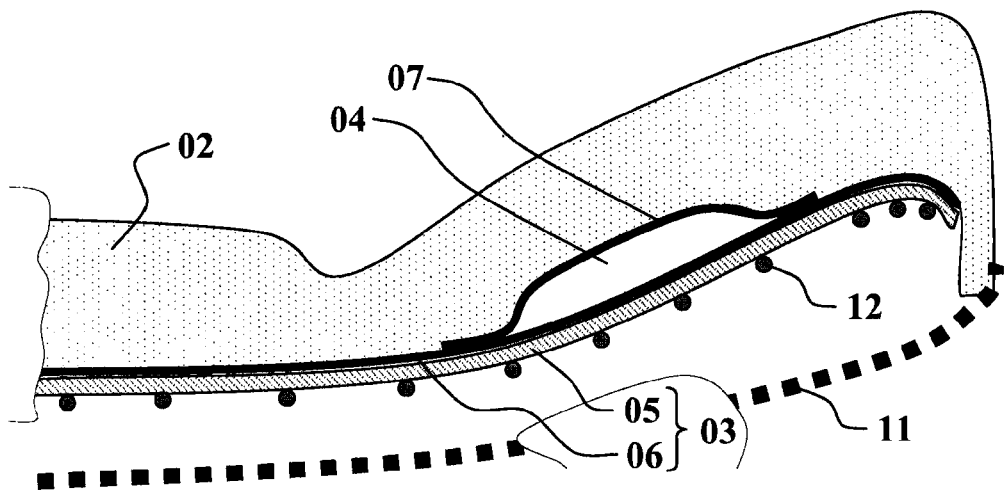
FIG. 2 shows a partial section though the seat cushion having a bubble element.

FIG. 2 shows a section through this exemplary embodiment. The foam body 02, which is primarily responsible for cushioning, is situated on the upper side. Shape adaptation of the seat contour is correspondingly fulfilled by the bubble element 04. This bubble element is correspondingly formed by two bubble halves. One bubble half 07 facing towards the foam body has the size of the bubble element with a peripheral sealing rim. The second bubble half is formed by the barrier layer 06, which is a part of the carrier element 03. Besides, the carrier element is composed of the nonwoven layer 05. This layer structure of the carrier element made of a nonwoven fabric 05 and the barrier layer 06 is exemplary in view of the fact that a single layer made of a plastic foil would also be sufficient. Moreover, the seat back shell 11 is outlined, which is disposed on the back side of the seat cushion 01. The seat cushion 01 in turn directly abuts against the support structure 12 of the cushion element. The support structure 12 may be designed to be punctiform or linear or else in a sheet-like manner. Depending on the type of the support structure, it is a function of the carrier element 03 to realize uniform force transmission into the seat cushion 01. In particular at the bubble element 04, it is essential to prevent unacceptable deformation of the carrier element 03 between exposed support structures 12 upon application of pressure.

Where appropriate, it is also conceivable to configure the bubble element 04 not exclusively in the form of an air-filled vacuity, but optionally likewise in the form of a foam-filled body. The application of pressure onto the bubble element 04 in this instance would equally give rise to expansion and thus increase of the foam volume.

Figure 3:
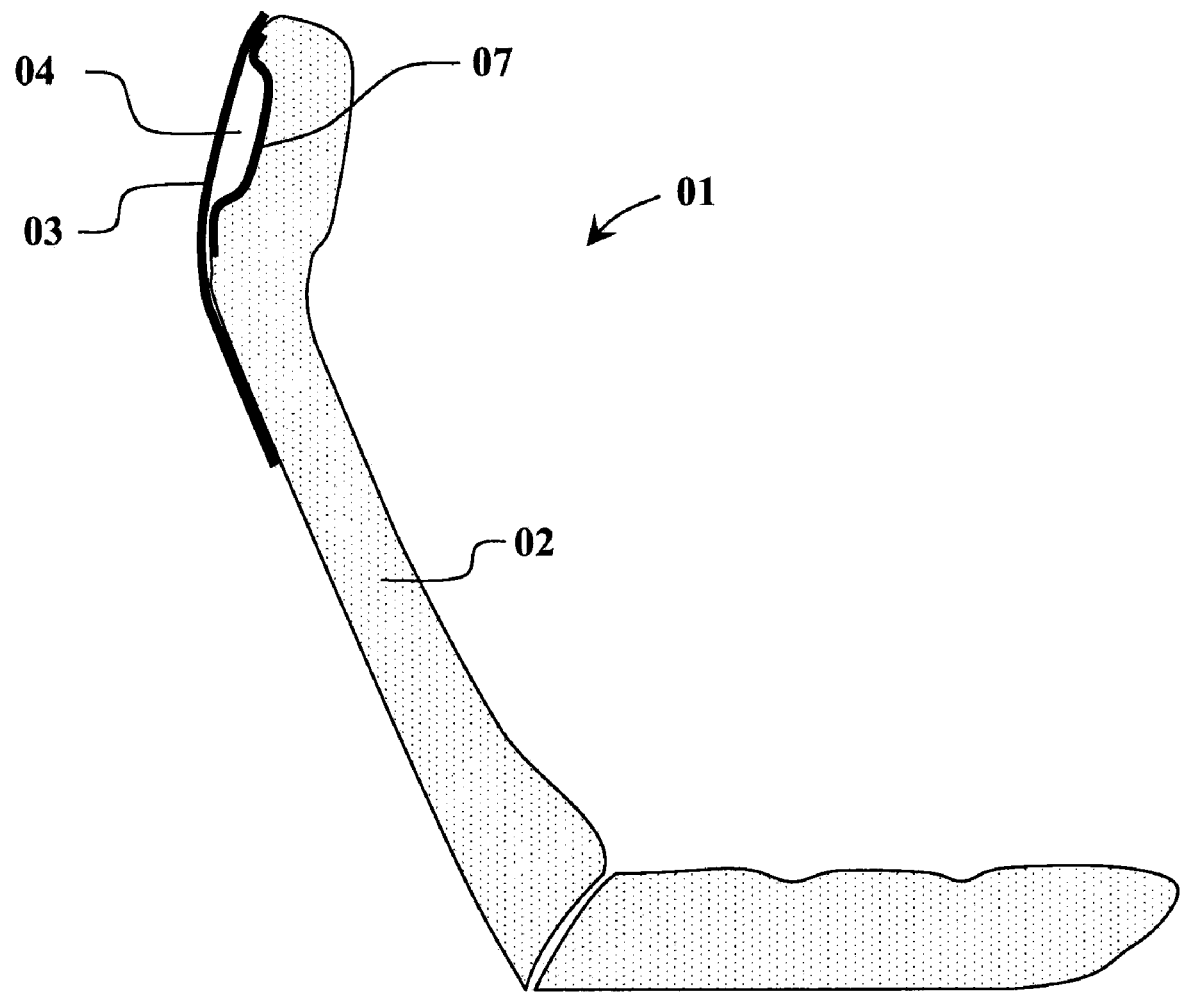
FIG. 3 shows a section through an exemplary embodiment of a back rest cushion having a head rest.

FIG. 3 exemplarily shows a section through a practicable embodiment of a seat cushion 01 fulfilling the function of a back rest and a head rest. The seat cushion 01 in turn is primarily formed from the foam body 02. To realize the adjustment function of the head rest, a bubble element 04 is correspondingly disposed on the back side thereof. In compliance with the advantageous configuration, the airtight carrier element 03 is situated on the back side of the bubble element 04 and the foam body 02. The second bubble half 07 is situated on the opposite side of the bubble element 04 in the direction of the foam body 02. It is readily conceivable how adaptation to the head abutment is supposed to be realized as a result of a change in the volume of the bubble element 04.

The invention claimed is:

1. A seat cushion for the production of a vehicle seat, the seat cushion comprising:
   a foam body having a back side;
   a carrier element including a stiffened nonwoven material disposed on the back side of the foam body and providing mechanical support to the foam body on the back side thereof, said carrier element further including an air-impermeable barrier layer formed by a plastic foil on a side of the carrier element facing towards the foam body;
   at least one bubble element disposed between the foam body and the carrier element, wherein the bubble element comprises first and second bubble halves that are connected to one another by means of an airtight sealing joint, the first bubble half faces away from the foam body and is formed by a surface section of the barrier layer of the carrier element, and the second bubble half faces towards the foam body and is fastened at the surface section of the barrier layer while forming the airtight sealing joint; and
   an air inlet in fluid communication with the at least one bubble element for supplying compressed air to the at least one bubble element,
   wherein the barrier layer includes one of perforated portions and punched-out portions such that the barrier layer is air-permeable outside of the bubble elements.

2. The seat cushion according to claim 1, in which the stiffened nonwoven material is a nonwoven polyester fabric.

3. The seat cushion according to claim 1, in which the plastic foil is one of a PU foil and a PVC foil.

4. The seat cushion according to claim 1, in which the carrier element is formed from the barrier layer.

5. The seat cushion according to claim 1, in which the second bubble half is connected to the assigned surface section of the barrier layer in a welded or adhesively-bonded fashion.

6. The seat cushion according to claim 1, in which by fastening several bubble halves at different surface sections of the barrier layer, several bubble elements are formed at the carrier element.

7. The seat cushion according to claim 1, in which at the seat cushion provision is made for a central air inlet from which several bubble elements can be jointly supplied with compressed air via a compressed air distribution system fastened at and/or foamed into the carrier element.

8. The seat cushion according to claim 7, in which at least one valve unit is provided in the compressed air distribution system, wherein by means of actuating the valve unit, air supply to at least one bubble element can be manipulated.

9. The seat cushion according to claim 1, in which the bubble element features several air outlet openings from which compressed air is allowed to escape into the foam body.

10. The seat cushion according to claim 1, in which a flat partition element for evenly distributed introduction of forces is disposed between the bubble element and the foam body.

11. The seat cushion according to claim 1, in which the carrier element is three-dimensionally preformed so as to correspond to the shape of the support structure of the seat cushion.

12. The seat cushion according to claim 1, in which the seat cushion includes the functionality of a head rest, wherein a support structure of the seat cushion fixed relative to a back rest of the seat is provided in the region of the head rest, and wherein adaptation of head abutment against the head rest is facilitated by at least one bubble element.

13. A seat cushion for the production of a vehicle seat, the seat cushion comprising:
   a foam body having a back side;
   a carrier element including a stiffened nonwoven material disposed on the back side of the foam body and providing mechanical support to the foam body on the back side thereof, said carrier element further including a barrier layer formed by a plastic on a side of the carrier element facing towards the foam body;
   at least one bubble element disposed between the foam body and the carrier element, wherein the bubble element comprises first and second bubble halves that are connected to one another by means of an airtight sealing joint, the first bubble half faces away from the foam body and is formed by an air-impermeable surface section of the barrier layer of the carrier element, and the second bubble half faces towards the foam body and is fastened at the surface section of the barrier layer while forming the airtight sealing joint; and
   an air inlet in fluid communication with the at least one bubble element for supplying compressed air to the at least one bubble element,
   wherein at least a portion of the barrier layer is air-permeable outside of the bubble elements.

14. The seat cushion according to claim 13, in which the plastic foam is a PU foam.

15. The seat cushion according to claim 13, in which the stiffened nonwoven material is a nonwoven polyester fabric.

16. The seat cushion according to claim 13, in which the carrier element is formed from the barrier layer.

17. The seat cushion according to claim 13, in which the second bubble half is connected to the assigned surface section of the barrier layer in a welded or adhesively-bonded fashion.

18. The seat cushion according to claim 13, in which at the seat cushion provision is made for a central air inlet from which several bubble elements can be jointly supplied with compressed air via a compressed air distribution system fastened at and/or foamed into the carrier element, and in which at least one valve unit is provided in the compressed air distribution system, wherein by means of actuating the valve unit, air supply to at least one bubble element can be manipulated.

19. The seat cushion according to claim 13, in which the bubble element features several air outlet openings from which compressed air is allowed to escape into the foam body.

20. The seat cushion according to, claim 13, in which a flat partition element for evenly distributed introduction of forces is disposed between the bubble element and the foam body.

* * * * *